Figure 1:
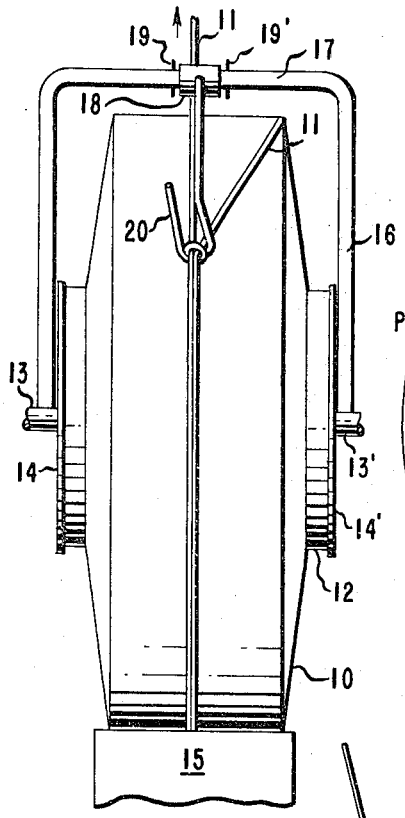
Figure 2:
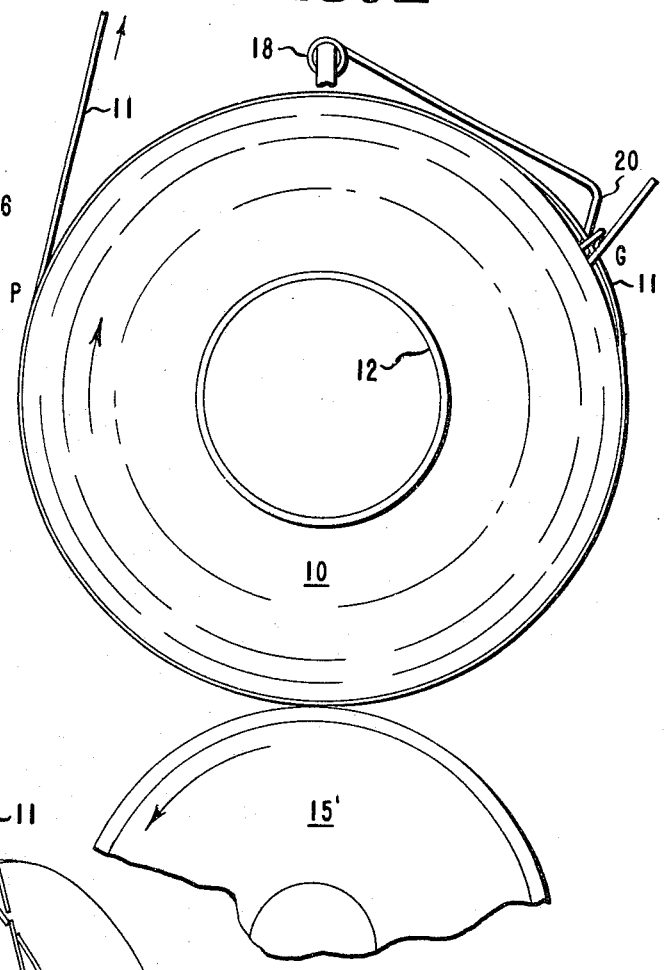
Figure 3:
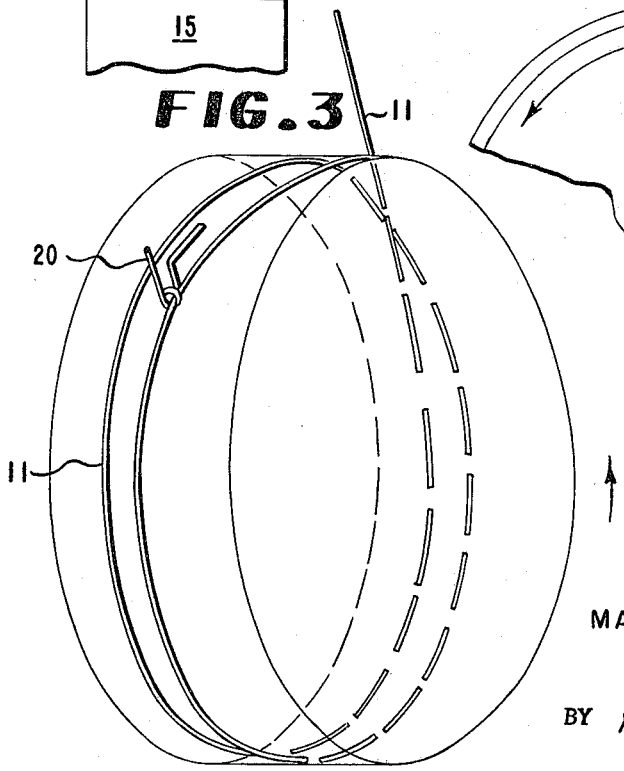

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 30, 1969

869 O.G. 1385

T869,019

PROCESS AND APPARATUS FOR UNWINDING YARN FROM A PACKAGE

Manfred Gunter Koslowski, 27 Chemin De La Vendee, Petit Lancy, Geneva, Switzerland

Filed Feb. 27, 1969, Ser. No. 803,010
Int. Cl. B65h *49/34, 57/00*
U.S. Cl. 242—54
1 Sheet Drawing. 7 Pages Specification

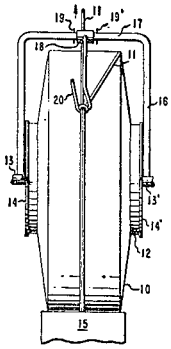

A process and apparatus for avoiding fouling of yarn, particularly spandex, as the yarn is unwound from a package. One of the outermost wraps of yarn is passed through a guide positioned near a central point on the package surface and spaced circumferentially from the yarn take-off point on the package surface. After passing through the guide, the yarn passes at least 180° around the package surface before being withdrawn tangentially. The yarn is thereby prevented from slipping off the package shoulder during unwinding. By causing the yarn to make at least one revolution around the package surface after passing through the guide and before being withdrawn, tension variations in the yarn are minimized or equalized.

Dec. 30, 1969 M. G. KOSLOWSKI T869,019

PROCESS AND APPARATUS FOR UNWINDING YARN FROM A PACKAGE

Filed Feb. 27, 1969

INVENTOR
MANFRED GUNTER KOSLOWSKI

BY Howard P. West Jr.
ATTORNEY